US006897382B2

(12) United States Patent
Hager et al.

(10) Patent No.: US 6,897,382 B2
(45) Date of Patent: May 24, 2005

(54) LOW COST, HIGH PERFORMANCE, RODENT RESISTANT, FLEXIBLE REINFORCEMENT FOR COMMUNICATIONS CABLE

(75) Inventors: Thomas P. Hager, Westerville, OH (US); Richard N. Lehman, Newark, OH (US); James R. Priest, Nashport, OH (US)

(73) Assignee: Neptco JV LLC, Pawtucket, RI (US)

( * ) Notice: Subject to any disclaimer, the term of this patent is extended or adjusted under 35 U.S.C. 154(b) by 0 days.

(21) Appl. No.: 10/408,953

(22) Filed: Apr. 8, 2003

(65) Prior Publication Data

US 2004/0050584 A1 Mar. 18, 2004

Related U.S. Application Data

(63) Continuation-in-part of application No. 10/246,007, filed on Sep. 18, 2002.

(51) Int. Cl.$^7$ .................................................. H01B 7/00
(52) U.S. Cl. ............... 174/116; 174/113 R; 174/110 R; 174/107; 174/119 C
(58) Field of Search ............................ 174/116, 113 R, 174/110 R, 107, 119 C (56) References Cited

U.S. PATENT DOCUMENTS

| 4,505,541 | A | * | 3/1985 | Considine et al. ........... 385/107 |
| 4,636,437 | A | * | 1/1987 | Algrim et al. ............... 428/391 |
| 4,781,432 | A |   | 11/1988 | Zongor et al. |
| 5,286,562 | A | * | 2/1994 | Girgis ......................... 428/391 |
| 5,512,625 | A |   | 4/1996 | Butterbach et al. .......... 524/490 |

FOREIGN PATENT DOCUMENTS

| EP | 0 291 023 | 11/1988 | ........... B29C/47/02 |
| EP | 0 685 855 | 12/1995 | ............ H01B/7/28 |
| EP | 1 076 253 | 2/2001 | ............ G02B/6/44 |
| GB | 1 485 253 | 9/1977 | |
| JP | 01022982 A | * 1/1989 | ............ C09K/3/10 |

OTHER PUBLICATIONS

Abstract in English of JP 01022982A–Derwent Acc No. 1989–071749.*

* cited by examiner

Primary Examiner—Dean A. Reichard
Assistant Examiner—Jinhee Lee
(74) Attorney, Agent, or Firm—Mintz, Levin, Cohn, Ferris, Glovsky and Popeo PC (57) ABSTRACT

A low cost, high performance flexible, rodent resistant reinforcement member that can be used for both optical and copper communications cable. The reinforcement members made according to the preferred process are more rigid than known reinforcement members, but are less rigid than glass pultruded rods. Communications cables utilizing these members are lightweight and exhibit an improved combination of strength and flexibility compared to traditional communications cables. Further, these communication cables may then be installed into underground ducts using more economical and faster installation techniques.

15 Claims, 12 Drawing Sheets

LOW COST, HIGH PERFORMANCE, RODENT RESISTANT, FLEXIBLE REINFORCEMENT FOR COMMUNICATIONS CABLE

CROSS REFERENCE TO RELATED APPLICATIONS

This application is a continuation-in-part of U.S. patent application Ser. No. 10/246,007, filed Sep. 18, 2002, which is herein incorporated by reference in its entirety.

TECHNICAL FIELD AND INDUSTRIAL APPLICABILITY OF THE INVENTION

The present invention relates generally to reinforced communication cables and more specifically to low cost, high performance, rodent resistant flexible reinforcement for communications cables.

BACKGROUND OF THE INVENTION

The market for telecommunications cable and related products is in an over capacity state. The large number of suppliers of these products has put tremendous pressure on the industry to provide communications cable with increased performance at lower costs.

Rodents cause significant problems in cable environments. Their incessant need to chew in order to control tooth size is relentless. One correctly placed incision by a rodent could destroy an optical fiber and result in the loss of millions of dollars in sales of telecommunications traffic. To date, cable manufacturers have used steel tapes to armor the cable. This steel barrier is highly effective in preventing rodents from breaching the cable. However, it has the same deterring effect on cable installers. The result is not only additional expense in cable manufacturing but also in installation.

In the past, rodent resistant cables have been constructed to include steel tape-wound outer jackets. In other designs, an inner jacket of thermoplastic is overlaid with a corrugated steel tape, the overlap of which is welded to produce a watertight armouring. For example; an outer polyethylene cable jacket is bonded to a polymer coating on the steel armouring enhancing the protection given to the cable against rodents. In other rodent resistant cable designs, the cable is protected by a plurality of spikes, which extend radially outward from an outer jacket, which completely encircles and covers the cable. The use of poisons has also been employed inside cables.

Flexible cable reinforcements are almost always applied around the cable core to provide strength during installation. If these reinforcements could also act to prevent rodents from damaging the optical fibers, costs could dramatically be reduced. The present invention is multi-functional cable reinforcement. First, it provides tensile strength to the cable for installation. Next, it blocks water intrusion with its hydrophobic coating. Further, it acts as a crush resistant layer dispersing the energy of any impact the cable may see. Finally, if a rodent should opt to chew on the cable it will find the irritation from the glass fibers in this product to be unbearable and desist from further chewing.

The large fiber diameter (between about 1 to about 89 microns) of this product acts to enhance the irritation capacity while the coating holds the irritating fibers in place, imbedded in the surface of the rodent's mouth, gums and lips. Finally, the chewy nature of the coating will be tactilely displeasing to the rodent and discourage further chewing.

Optical communications cables consist essentially of a plurality of randomly placed optical communication fibers, typically in ribbon form, contained within a polymer jacket. Of course, other types of communications cables can have single optical fibers, bundled optical fibers, or tight buffered optical fibers. The fibers are typically tight or loose buffered within a polymer tube contained within a portion of the jacket. One or more flexible reinforcement members and stiff strength members may also be contained within a portion of the polymer jacket outside of the central tube or buffer tubes to provide support and prevent kinking of the communication fibers. These reinforcement members are applied by being wrapped helically around the inner core prior to outer jacketing (as in optical loose tube cable types) or are directly extruded into the jacket matrix (as in twisted copper telephone cable).

The flexible reinforcements for cables are made in a wide variety of methods. Typically, these reinforcements are manufactured by first applying a binder and sizing containing a film former and oils or coupling agents to a glass strand and then applying a relatively heavy layer of a water-based, high molecular weight polymer latex or wax. The coated strands may then be introduced to the communications cables by known methods.

These coatings may impart many important properties to the flexible reinforcements both during manufacture and after introduction to the cable. For example, these coatings prevent abrasion of the glass fibers during the combination with the reinforcement and during deployment. Also, these coatings prevent adhesion of the reinforcing fibers to the polymer jacket. These coatings may also impart adhesion if desired to the polymer jacket, for example, as is the case with polyvinyl chloride (PVC) jacketed communications cables. Additionally, these coatings can be super absorbent and can thus prevent water seepage from damaging the optical fibers.

SUMMARY OF THE INVENTION

A low cost, high performance, rodent resistant flexible glass reinforcement member is provided that can be used for both optical and copper communications cables. The reinforcement members made according to the preferred process are more rigid than glass reinforcement members made according to the prior art as described above, but are less rigid than glass pultruded rods. Further, the reinforcements have a large fiber diameter. Communications cables utilizing these members are lightweight, exhibit an improved combination of strength and flexibility compared to traditional communications cables and provides resistance to rodents chewing the cable. These communication cables may then be installed into underground ducts using more economical and faster installation techniques such as blowing-in installation.

This rodent resistant, flexible reinforcement member is made by melting and then applying a low molecular weight, low melt viscosity thermoplastic material, such as modified or wax, to fiber material. The fiber material can be a glass strand or bundle, or combination of strand and bundle that penetrates the interstices within and between the fibers. Glass fibers that may be used include E-type glass fibers or ECR-type glass fibers such as Advantex® type glass fibers, both available from Owens Corning. Additionally, other fibrous materials can be used as will be described below.

To deter a Rodent from chewing a cable, it is preferred that a high modulus glass fiber be used. It is important that the high modulus glass fiber have a large enough diameter to provide substantial irritation to the mouth of a rodent. The diameter of the fiber is preferably between about 1 and about 89 microns, more preferably between about 15 and about 36 microns and most preferably between about 34 and about 36 microns.

In another embodiment, the wax material is air cooled prior to the introduction of a second layer of nonwater-based high molecular weight ("MW") polymer, such as EAA, that is applied to the strand in an extruder or similar device. The high molecular weight polymer surrounds the strands, but does not penetrate. The high MW polymer is tough, but flexible, and gives the strand mechanical properties for use in cable systems. The overall amount of high MW polymer applied to the strand is less than is present in cables of the prior art.

In another embodiment, the member is made by first applying a low molecular weight, thermoplastic blend of a blend of low molecular weight, low melt viscosity and high molecular, relatively high melt viscosity thermoplastic or thermoplastic elastomeric material to the fiber material. An example of this is a blend of microcrystalline wax and a plasticized styrene butadiene rubber. The blend penetrates the interstices within and between the fibers to form a member having adequate mechanical properties. As a topcoat is not needed, a cost savings is realized in terms of manufacturing and raw material costs. Of course a topcoat could still be applied if so desired This flexible reinforcement made according to these processes exhibits lower amounts of trapped air that is typically trapped within the strands and/or bundles, thereby decreasing the likelihood and amount of potential degradation within the fiber. The method also prevents strand deficiencies such as fiber-fiber abrasion and water penetration, and can thereby increase the strength of the strands, and hence the reinforcement, without the application of a heavy layer of high MW polymer. Further, by not using a water-based coating, additional savings is realized by both in terms of the water removal and raw material costs.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
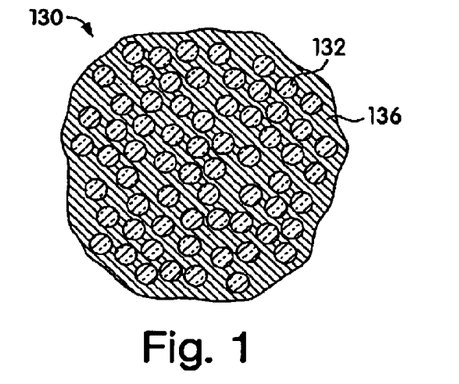
FIG. 1 is a cross-sectional view of a flexible reinforcement member according to the present invention.
Figure 2:
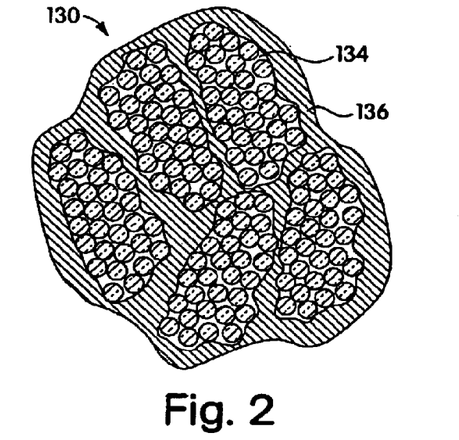
FIG. 2 is a cross-sectional view of a flexible reinforcement member according the present invention.
Figure 3:
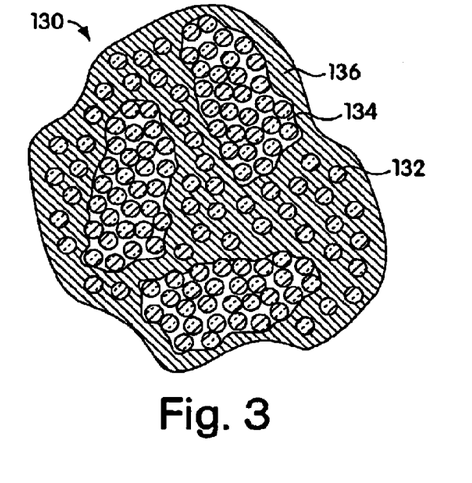
FIG. 3 is a cross-sectional view of a flexible reinforcement member according the present invention.

The present invention relates to a new rodent resistant, flexible reinforcement member that may be used in telecommunication cables such as optical cables or copper cables. FIGS. 1–3 below illustrate three preferred embodiments of the rodent resistant, flexible reinforcement member.

FIG. 1 illustrates a cross-sectional view of the rodent resistant, flexible reinforcement member 130 according to a preferred embodiment of the present invention. The member 130 is comprised of a strand having a plurality of single filaments 132 of glass fibers saturated with a primary saturant 136. The diameter of the filaments is preferably between about 1 and about 89 microns, more preferably between about 15 and about 36 microns and most preferably between about 34 and about 36 microns.

Referring now to FIG. 2, another preferred embodiment shows the member 130 having a plurality of strand bundles 134 replacing the individual filaments 132. Also, FIG. 3 depicts the member 130 as having a combination of both filaments 132 and bundles 134. Again, in both FIGS. 2 and 3, the fibers that comprise the filaments 132 and/or bundles are saturated with the primary saturant 136. The filaments 132 are preferably filamentized strands and are approximately 1 to about 86 microns in diameter, more preferably between about 15 and about 36 microns in diameter and most preferably between about 34 and about 36 microns in diameter. The bundles 134 have approximately 100–4000 filaments per bundle 134 and have a linear density of approximately 200–9600 grams/kilometer.

The filaments 132 and bundles 134 are preferably glass fibers such as E-type glass fibers or ECR-type glass fibers such as Advantex® type glass fibers, both available from Owens Corning. A-type glass fibers, S-type glass fibers . . . . Additionally, other fibers may be used including, but not limited to, high silica glass such as S-2 Glass®, Zentron®, Vetron® or other high strength glass from Advanced Glass Yarns (Aiken, S.C.) or other glass manufacturers; high tenacity, linear, or other high modulus reinforcements. The term "high modulus" is defined as the modulus of elasticity, also known as Young's Modulus, which is a coefficient of elasticity representing the ratio of stress to strain as a material is deformed under dynamic load. It is the measure of softness or stiffness of a material. In the case of "high modulus" reinforcements, the values for the stress to strain ratio will typically exceed 30 GPa. For the above examples, the typical elastic modulus of each are as follows: E-Glass= 72 GPa; S-2 Glass® fiber=90 GPa. Alternatively, the reinforcement member may be made of other materials that would inhibit chewing by rodents, including but not limited to, steel, brass, copper, ceramic, rock wool or combinations thereof.

As another alternative to deter rodent chewing, the fibers may be coated with a particulate, sharp, abrasive material such as crushed ceramic, metal slivers, abrasive particles such as alumina, silica, sand stone, quartz, salts, diamond dust, iron pyrite flint, slate vermicalcite or other flaky rock particles, crushed glass, silicon carbide, abrasive bauxite, metallic shards or combinations thereof. The abrasive particles may be added to the primary saturant bath, sprayed on, or applied via a standard powder coating process. Alternatively, the particles may be applied to the fibers an off-line process.

The glass fibers are preferably sized with one of Owens Corning's sizing compositions prior to introduction within the member 130. Preferably Owens corning sizing 158B, 111A or 366 is used; however, other epoxy/silane, vinylester, polyester, or starch/oil type sizings available from many manufacturers may also be used.

The saturant 136 fills in the interstices between the strands 132 and/or bundles 134 and comprises about 0.1–35 percent, and more preferably about 15 percent, of the total weight of the member 130. The saturant 136 also fills the voids within the filaments 132 and/or bundles 134 caused by abrasions and or defects in the manufacturing process. In this way, the saturant 136 functions to lower the amount of air that is typically trapped between the filaments 132 and bundles. The saturant also lowers the amount of air that may be trapped within the bundles 134. The saturant 136 also prevents filament 132 deficiencies such as fiber-fiber abrasion, water penetration, and can increase the strength of the filaments 132. In these ways, the saturant 136 increases the strength of the member 130.

The saturant 136 comprises a low molecular weight mineral wax having melting points under approximately 300 degrees Celsius, preferably less than 150 degrees Celsius and most preferably between about 100 and about 120 degrees Celsius and melt viscosities of less than approximately 1000 centipoise (cps), preferably less than 500 centipoise, that allow easy saturation into the fiber strands 132 or bundle 134. One preferable mineral wax is a microcrystalline wax such as Witco Chemical's Multiwax, which has a melting point of approximately 70–80 degrees Celsius (160–170 degrees Fahrenheit) and a melt viscosity of approximately 50–100 cps. Other examples of mineral waxes that may also be used include polyalphaolefin waxes, such as Baker Petrolite Vybar 260, and polyethylene waxes, such as Baker Petrolite Polywax 100. Additionally, modified polyethylenes and polypropylenes may also be used, such as Eastman Chemicals Epolene E-15 and E-43 oxidized polyethylene or Epolene G-3015 maleated polypropylene.

As shown in FIGS. 1–3, the primary saturant 136 is a 90/10 to 10/90 by weight blend, and more preferably a 50/50 by weight blend, of a microcrystalline wax and styrene butadiene rubber ("SBR") compound. As above, one preferred microcrystalline wax that may be used is Witco Chemical's Multiwax. One preferred SBR compound used in the saturant 136 is DHM 712, available from DHM Adhesives, Inc. The DHM 712 has a softening point of approximately 95 degrees Celsius (203 degrees Fahrenheit) and a viscosity of 2250 cps at 177 degrees Celsius (350 degrees Fahrenheit). Blends of other high and low viscosity thermoplastic polymers or highly plasticized polymers can be similarly used, as long as the primary saturant material has less than 500 cps melt viscosity.

Figure 5:
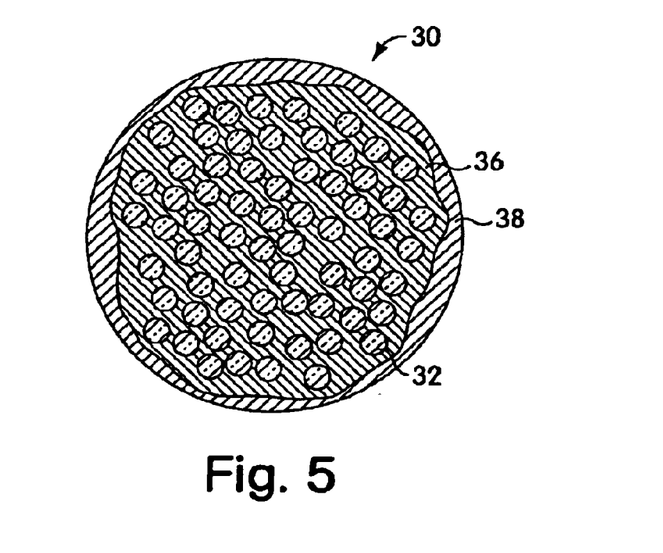
FIG. 5 is a cross-sectional view of a flexible reinforcement member according another embodiment of the present invention.
Figure 6:
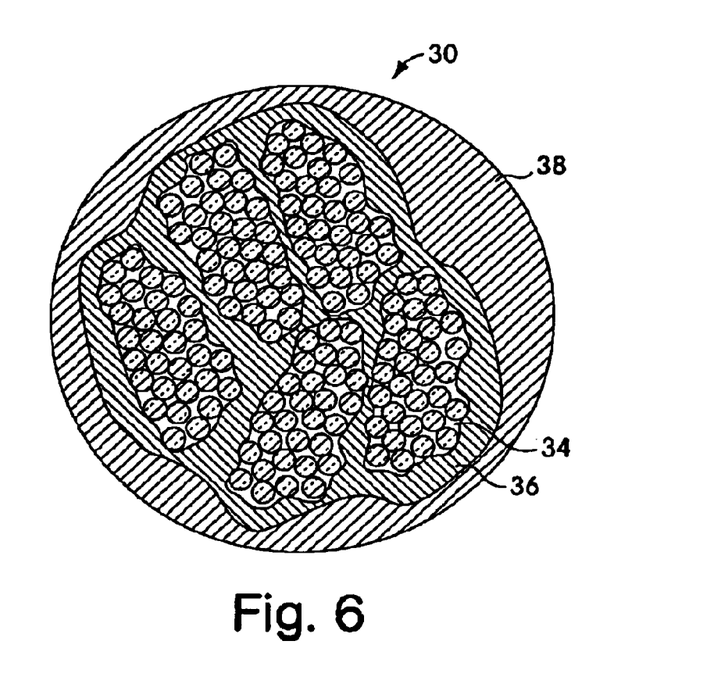
FIG. 6 is a cross-sectional view of a flexible reinforcement member according to another embodiment of the present invention.
Figure 7:
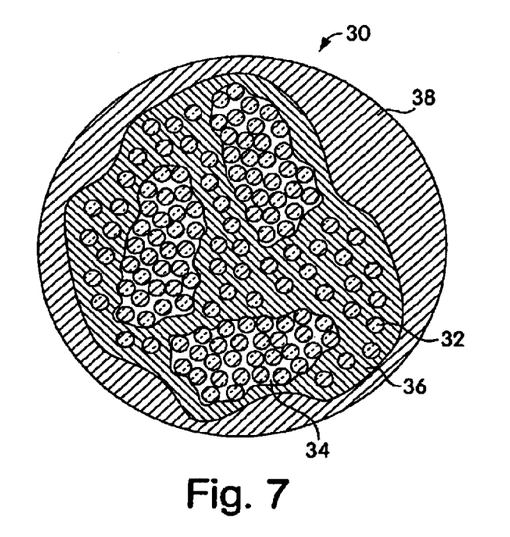
FIG. 7 is a cross-sectional view of a flexible reinforcement member according to another embodiment of the present invention.

Alternatively, as shown in FIG. 5–7, a high molecular weight topcoat may be applied to the coated filaments 32 and bundle 14. The high molecular weight polymer topcoat 38 surrounds the saturant 36, but does not penetrate within the saturant 36 to the filaments 32 and bundle 34. The topcoat 38 comprises approximately 0.1–35 percent, preferably between about 5 to about 20 percent and more preferably between about 10 and about 15 percent, of the total weight of the member 30. The topcoat 38 is though, but flexible, and gives the member 30 its mechanical properties. The topcoat 38 is a higher modulus coating that changes the characteristics of the member 30. The topcoat 38 offers polyethylene adhesion and stiffens the member 30. Table 1 shows the polyethylene adhesion of individual glass strands according to ASTM D1871, Test Method #53.

Water swellable topcoats may be used on the member 30 to provide additional water protection capabilities to the optical fiber. Polymers containing a superabsorbent particulate material such as sodium or potassium polyacrylate salt (superabsorbent polymers) may be utilized as the topcoat. Examples of such polymers include, but are not limited to, ethylene vinyl acetate (EVA) polymers, block copolymers of polybutylene terepthalate and long chain polyether glycols, thermoplastic elastomers, olefins or urethanes, polypropylene, polyethylene, polyurethane or low molecular weight mineral wax. Polyacrylamides may also be utilized.

TABLE 1

Polyethylene Adhesion Individual Strand Pull-Outs (lbf/0.5 in)

|  | Wax Only | Wax + EAA Topcoat | DHM 712 Only | DHM 712 + EAA Topcoat | DHM 712 /EAA 70:30 Blend |
|---|---|---|---|---|---|
| 1 | 21.9 | 54.9 | 24.7 | 58.9 | 65.5 |
| 2 | 31.5 | 56.0 | 32.3 | 60.5 | 19.1 |
| 3 | 33.1 | 70.5 | 41.3 | 51.5 | 62.3 |
| 4 | 32.5 | 63.1 | 52.8 | 50.9 | 53.1 |
| 5 | 38.8 | 64.6 | 40.3 | 70.1 | 13.7 |
| 6 | 27.1 | 55.8 | 39.1 | 48.4 | 85.6 |
| 7 | 28.1 | 74.1 | 49.3 | 48.2 | 32.9 |
| 8 | 14.4 | 61.1 | 21.4 | 68.6 | 40.9 |
| 9 | 29.3 | 91.5 | 32.5 | 66.1 | 41.5 |
| 10 | 18.1 | 68.1 | 37.4 | 61.0 | 70.8 |
| 11 | 27.7 | 46.6 | 43.1 | 61.3 | 70.5 |
| 12 | 26.9 | 68.3 | 32.9 | 68.2 | 28.7 |
| 13 | 22.5 | 68.6 | 35.9 | 61.8 | 75.0 |
| 14 | 26.6 | 64.5 | 31.8 | 57.2 | 74.8 |
| Average | 27.0 | 64.8 | 37.0 | 59.5 | 52.5 |
| Std. Dev. | 6.3 | 10.6 | 8.6 | 7.4 | 23.0 |
| C.I. | 4 | 7 | 6 | 5 | 16 |
| Upper | 31 | 72 | 43 | 65 | 68 |
| Lower | 23 | 58 | 31 | 54 | 37 |

Test was strand pull out from polyethylene plaques. Raw data recorded in pounds of force per 0.5 inch imbedded strand. Polyethylene was cable jacketing grade, black compounded. Pulls done at room temperature. Test method used: ASTM D1871 Adhesion of Glass to PVC; Test Method #53.

One preferred topcoat 38 is an ethylene acrylic acid (EAA) polymer such as Dow Chemical's Primacor 5986 or 5990I ethylene acrylic acid resin, which is useful if adhesion to a polyethylene jacket is required. Other polymers that may comprise the topcoat 38 include polyethylene (PE) or polypropylene (PP) polymers, or copolymers of PE and PP, available from manufacturers such as Dow Chemical, Shell, and Basell. Still further preferable topcoats 38 include ethylene vinyl acetate (EVA) copolymers, styrene-butadiene-styrene (SBS), polybutadiene terephthlate polyether glycol (PBT-PEG), polyamide or many other polyolefins and thermoplastic elastomers available from manufacturers such as Henkel, GLS and E. I. Du Pont de Nemours. Of course, as one skilled in the art would appreciate, the ultimate choice of topcoats 38 is dependent upon the end use of the communications cable having the reinforcement member 30.

Figure 4:
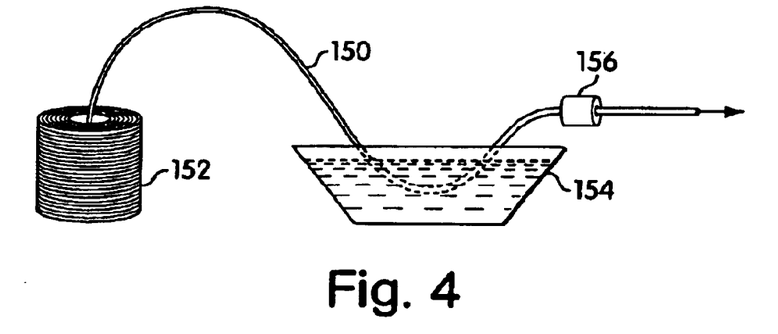
FIG. 4 illustrates an assembly line used for making the flexible reinforcement member according to FIGS. 1–3.

FIG. 4 illustrates the process for making the members 130 of FIGS. 1–3. The process begins by unrolling the fibers 150 from a reel 152. The fibers 150 represent filaments 132, bundles 134, or a combination of filaments 132 and bundles as depicted in FIGS. 1–3. The fibers 150 are introduced to an application device 154, here a heated immersion bath 154 that holds the saturant 136. The bath 154 is maintained between approximately 90–140 degrees Celsius (200–280 degrees Fahrenheit) such that the primary saturant 136 has a viscosity of approximately 50–100 cps.

The coated fibers 150 exit the bath 154 and are introduced to a stripper die 156. In the embodiment shown in FIG. 4, the stripper die 156 has an internal diameter of approximately 0.84 millimeters (0.033 inches) to strip back the excess saturant 36 and to help impregnate the fibers 150.

Figure 8:
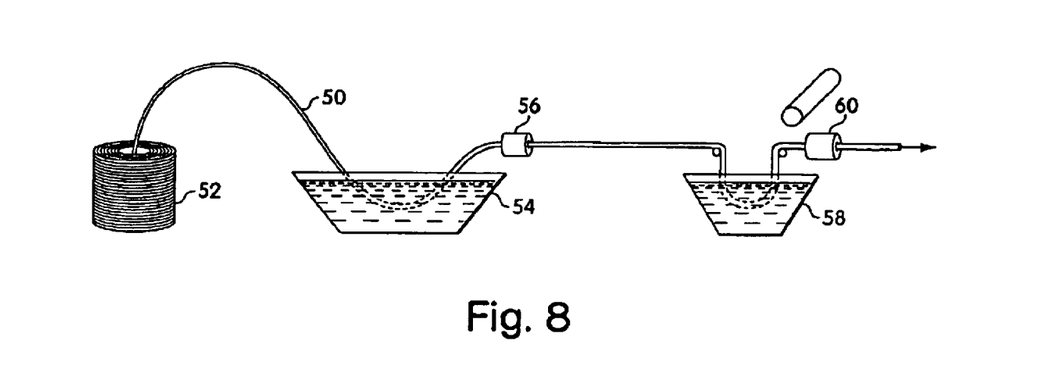
FIG. 8 illustrates an assembly line used for making the flexible reinforcement member according to FIGS. 5–7.
Figure 9:
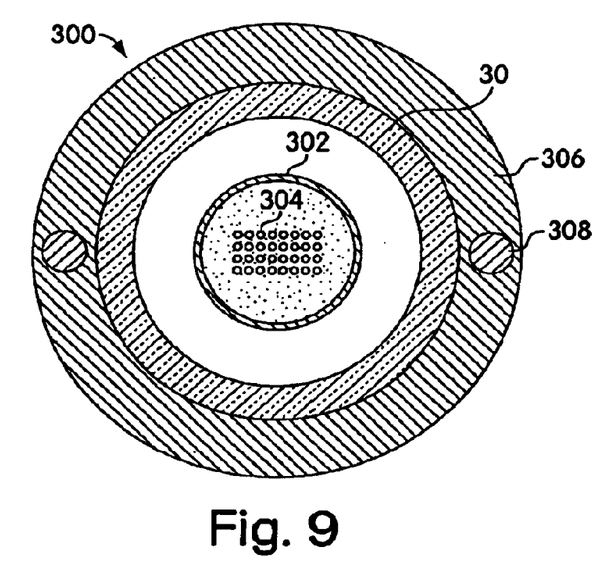
FIGS. 9–20 illustrate communications cables having the flexible reinforcement members of FIGS. 1–3 and FIGS. 5–7.
Figure 10:
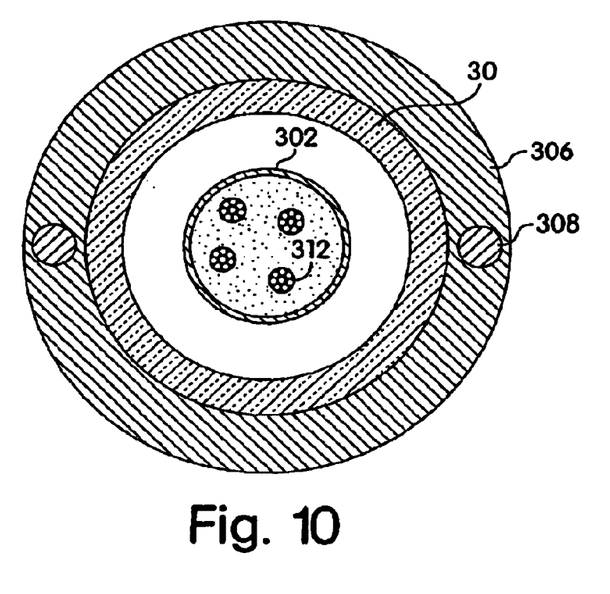
Figure 11:
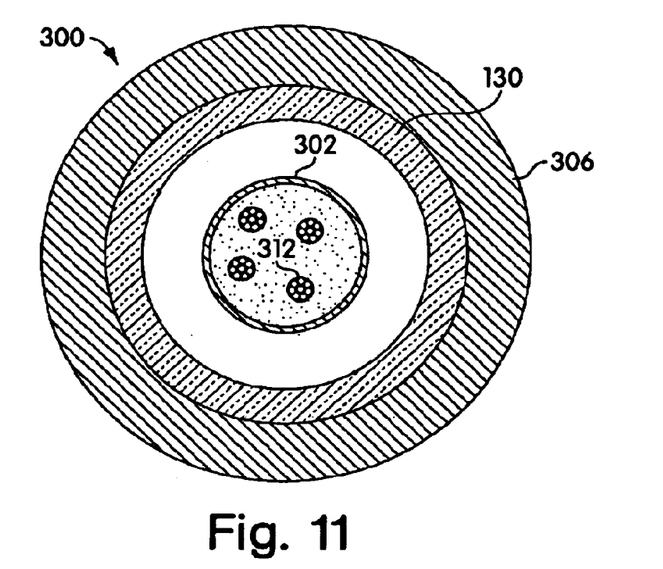
Figure 12:
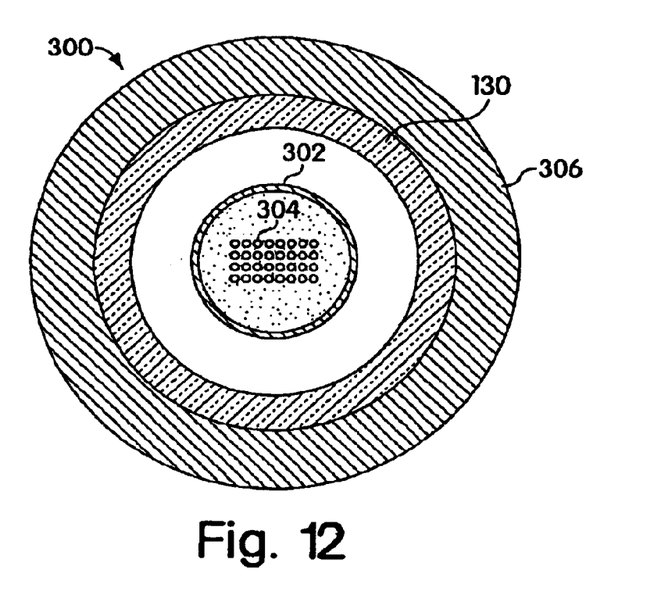
Figure 13:
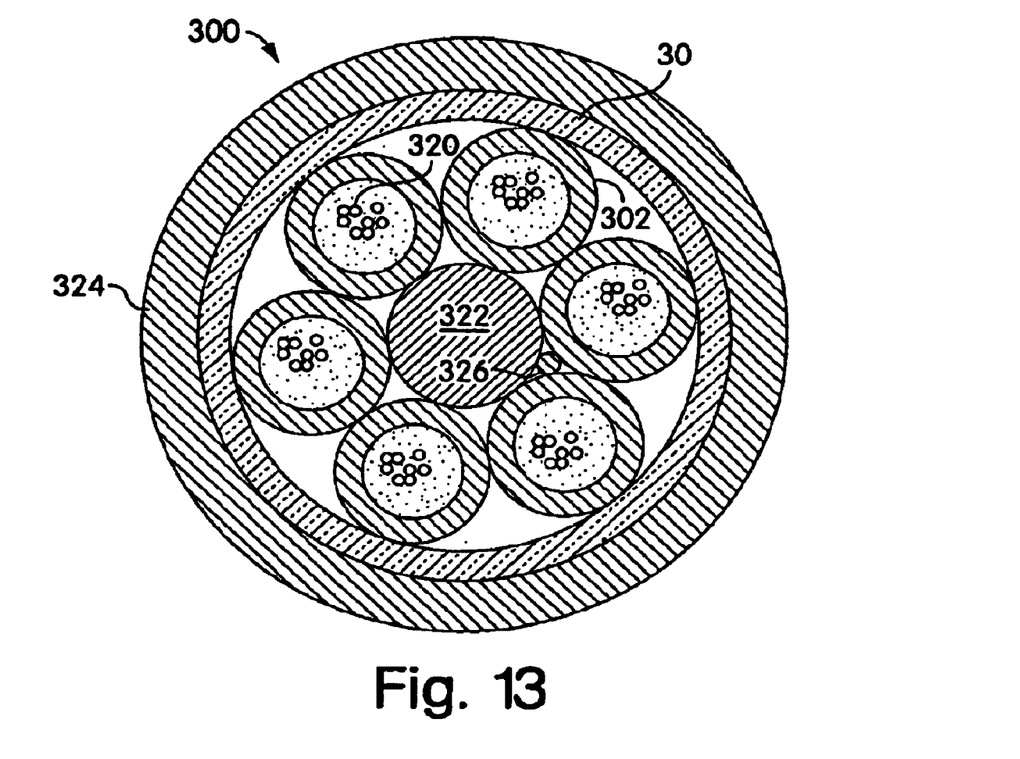
Figure 14:
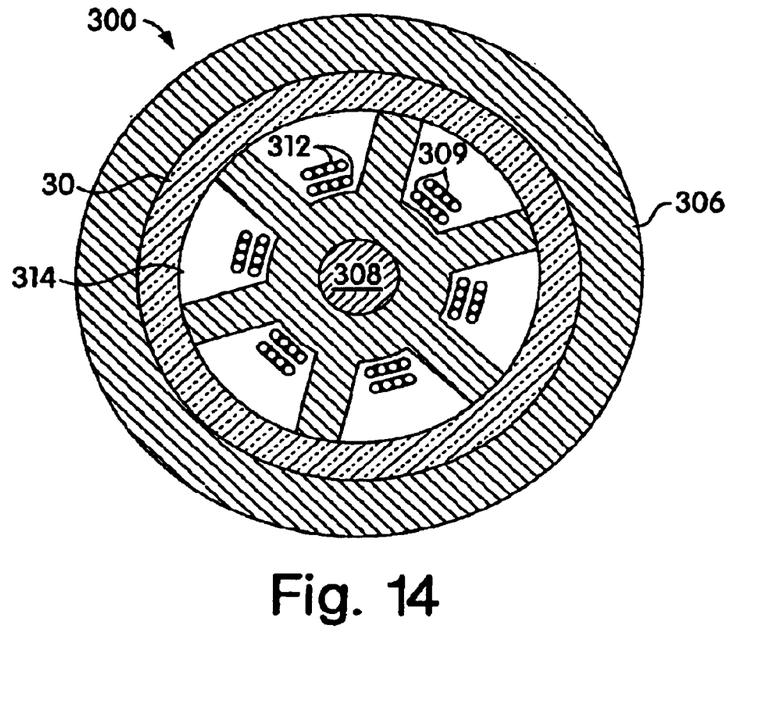

In an alternative embodiment, as shown in FIG. 8, the coated fibers 56 are introduced to an applicator 58 containing the topcoat 38. Preferably, the applicator 58, as shown here, is a Nordson hot melt applicator 58. The topcoat 38 enters the applicator 58 through an orifice (not shown) For Dow Primacor 5990I, which has a melt point index of 1300 grams per 10 minutes, the material is heated to approximately 125 degrees Celsius (257 degrees Fahrenheit) as it enters the fixed orifice through a thick hose (not shown) and applied to the fibers 50. The fibers 50 exit the applicator 58 and enter a second stripper die 60 having an inner diameter of approximately 1.12 millimeters (0.044 inches). The second stripper die 60 removes excess topcoat 38 and smoothes the outer surface of the topcoat 38. The topcoat is then cooled to form the reinforcement member 30.

In an alternative embodiment not shown, an extruder using a crosshead die or similar applicator apparatus may be used in place of the applicator 58 to introduce the topcoat 38 to the coated fibers 50.

FIG. 8 illustrates the process for making the members 30 of FIGS. 5–7. The process begins by unrolling the fibers 50 from a reel 52. The fibers 50 represent strands 32, bundles 34, or a combination of strands 32 and bundles 34 as depicted in FIGS. 1–3. The fibers 50 are introduced to a first application device 54, here a heated immersion bath 54 that holds the saturant 36. The bath 54 is maintained between approximately 120–150 degrees Celsius (250–300 degrees Fahrenheit) such that the primary saturant 36 has a viscosity of approximately 50–100 cps. The coated fibers 50 exit the bath 54 and are introduced to a stripper die 56. In the embodiment shown in FIG. 8, the stripper die 56 has an internal diameter of approximately 0.84 millimeters (0.033 inches) to strip back the excess saturant 36 and to help impregnate the fibers 50. The coated fibers 50 are then cooled to form the reinforcement member 30 having a diameter of between approximately 0.5 and 1.0 mm.

The rodent resistant, flexible reinforcement members 30, 130 of FIGS. 1–3 and 5–7 are then available to be inserted into a communications cable by known techniques.

FIGS. 15–18 illustrate a 48-fiber "Rodent Resistant Cable" structure 400 according to five preferred embodiments of the present invention. Each of these structures 400 having the flexible reinforcement member 30 or 130 offers increased strength and flexibility as compared to structures with traditional reinforcement members.

Figure 15:
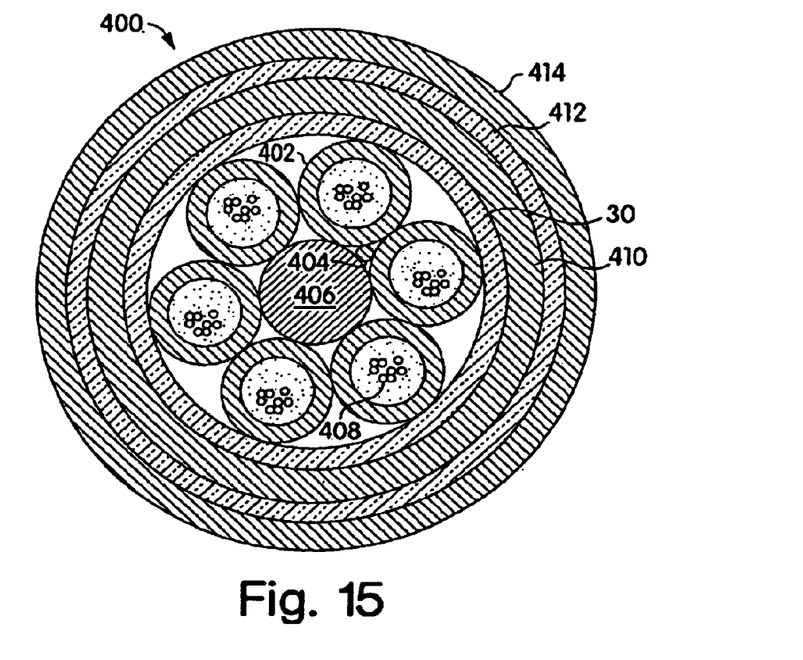

Referring now to FIG. 15, the structure 400 comprises a gel filled loose tube 402 and a water swellable thread 404 surrounding a central strength member 406. Each loose tube 402 has a plurality of loose optical fibers 408 and is surrounded by the flexible reinforcement member 30, an inner HDPE sheath 410, a layer of glass tape reinforcement 412, and an outer HDPE sheath 414.

Figure 16:
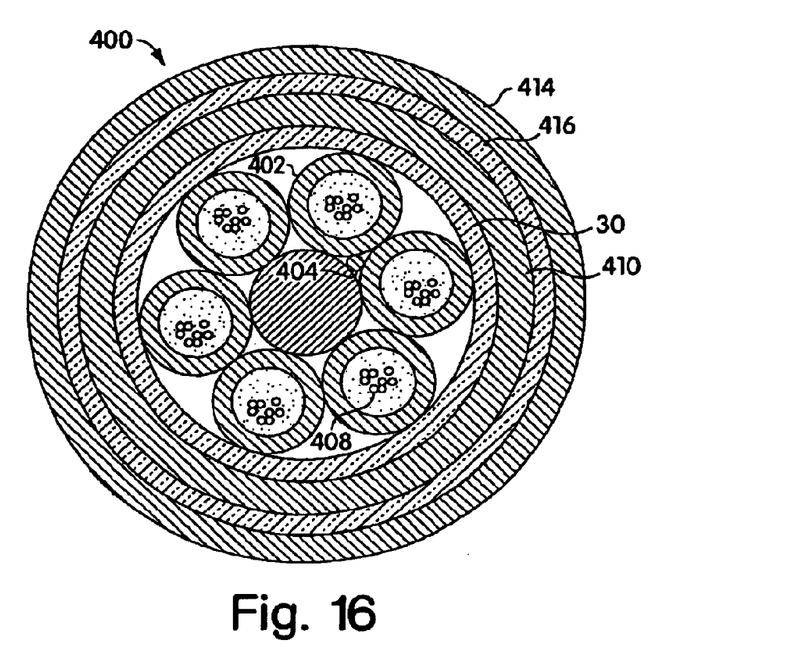
Figure 17:
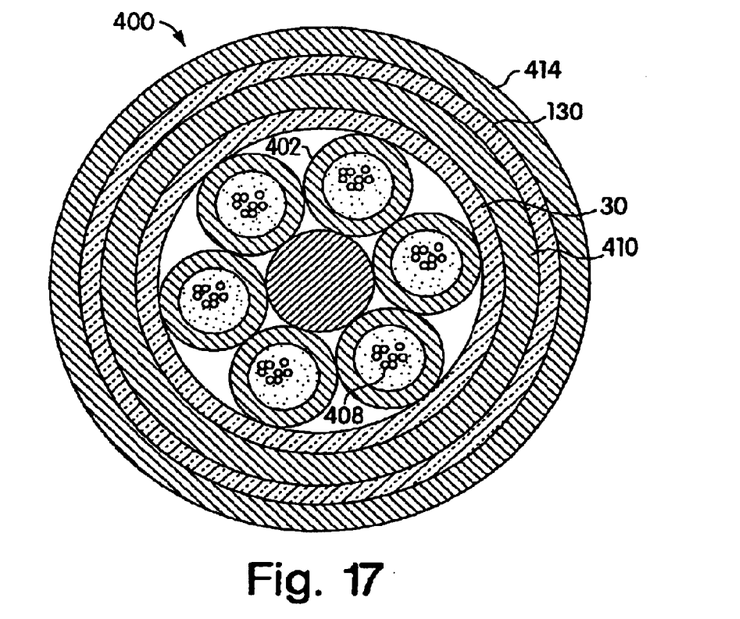

In FIG. 16, a layer of glass flex reinforcement 416 replaces the glass tape reinforcement 412. In FIG. 17, a layer of flexible glass reinforcement 130 replaces the glass tape reinforcement 412.

Figure 18:
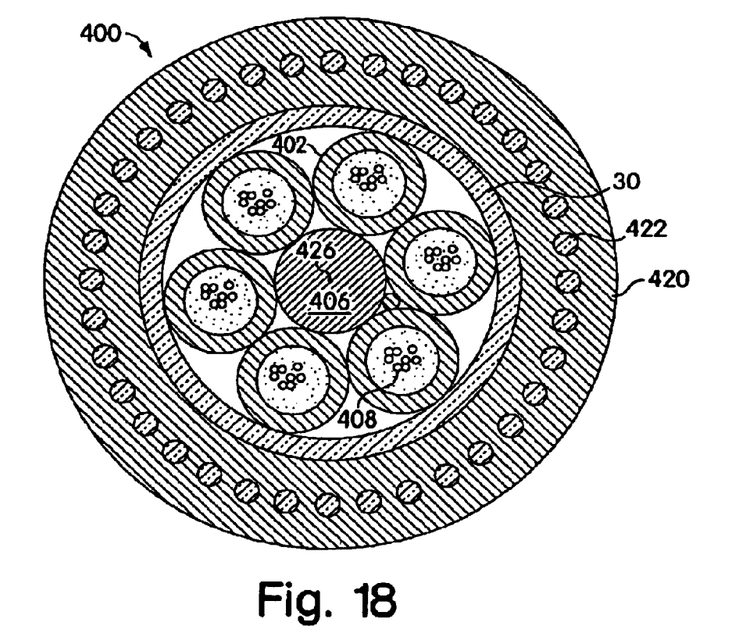
Figure 19:
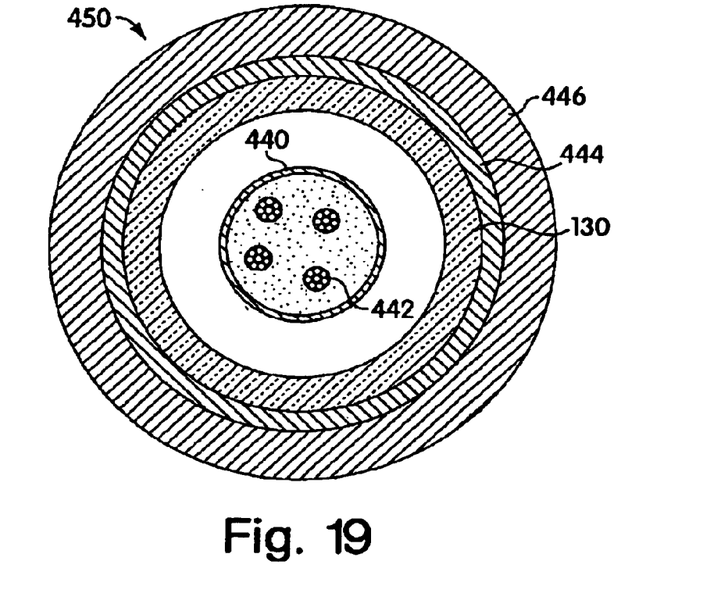
Figure 20:
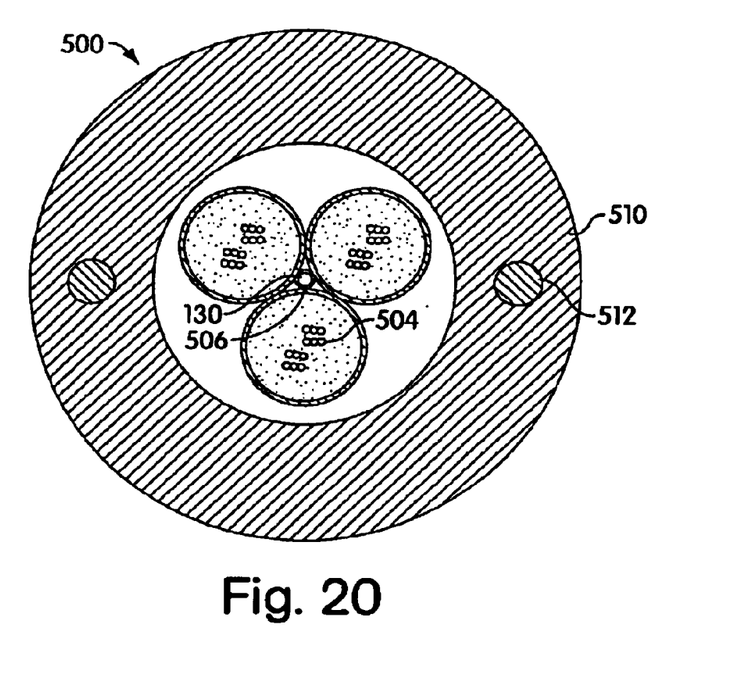

Referring now to FIG. 18, the loose tubes 402 are first surrounded by the flexible reinforcement member 30 which is surrounded by an outer HDPE sheath 420 having a plurality of fiber glass reinforcing rods 422. The rods 422, typically about 1.3 mm in diameter, are preferably evenly spaced within the HDPE sheath 420 and equidistant from a point 426 defining the center of the central strength member 406.

The embodiments as shown in FIGS. 9–20 illustrate the wide range of potential embodiments using the flexible reinforcement members 30, 130 of FIGS. 1–3 and 5–7 for use in optical fiber type communication cable systems. Of course, these members 30, 130 could be used in other systems as well, including, for example, copper communication cable systems.

The present invention offers many advantages over the prior art. Because the cable structures 300, 400, 500 having these reinforcement members 30, 130 are lighter than communications cables having traditional glass reinforcement members, installation of these cables within ducts in underground cable systems using known installation techniques such as blowing-in installation is possible, in which compressed air is used to install the cables within underground ducts. As one of skill in the art appreciates, the use of blowing-in installation is a cheaper, less time consuming, and gentler process for installing communication cables versus traditional installation techniques that utilize a winch and gripper to physically pull the cable through and into a duct.

Further, because these structures 300, 400, 500 are more flexible than communication cable structures requiring glass pultruded rods for strength, these structures 300, 400, 500 are more readily inserted around bends or corners in the ducts. Also, because the reinforcement members 30, 130 are stronger and have more rigidity or antibuckling properties than traditional flexible reinforcement members, attenuation of the optical fibers is prevented due cable shrinkage or expansion during daily or seasonal thermal cycling. Bunching or jamming of the communication cables during installation is also prevented due to the ability to engineer the right amount of cable rigidity to prevent these installation problems.

Figure 21:
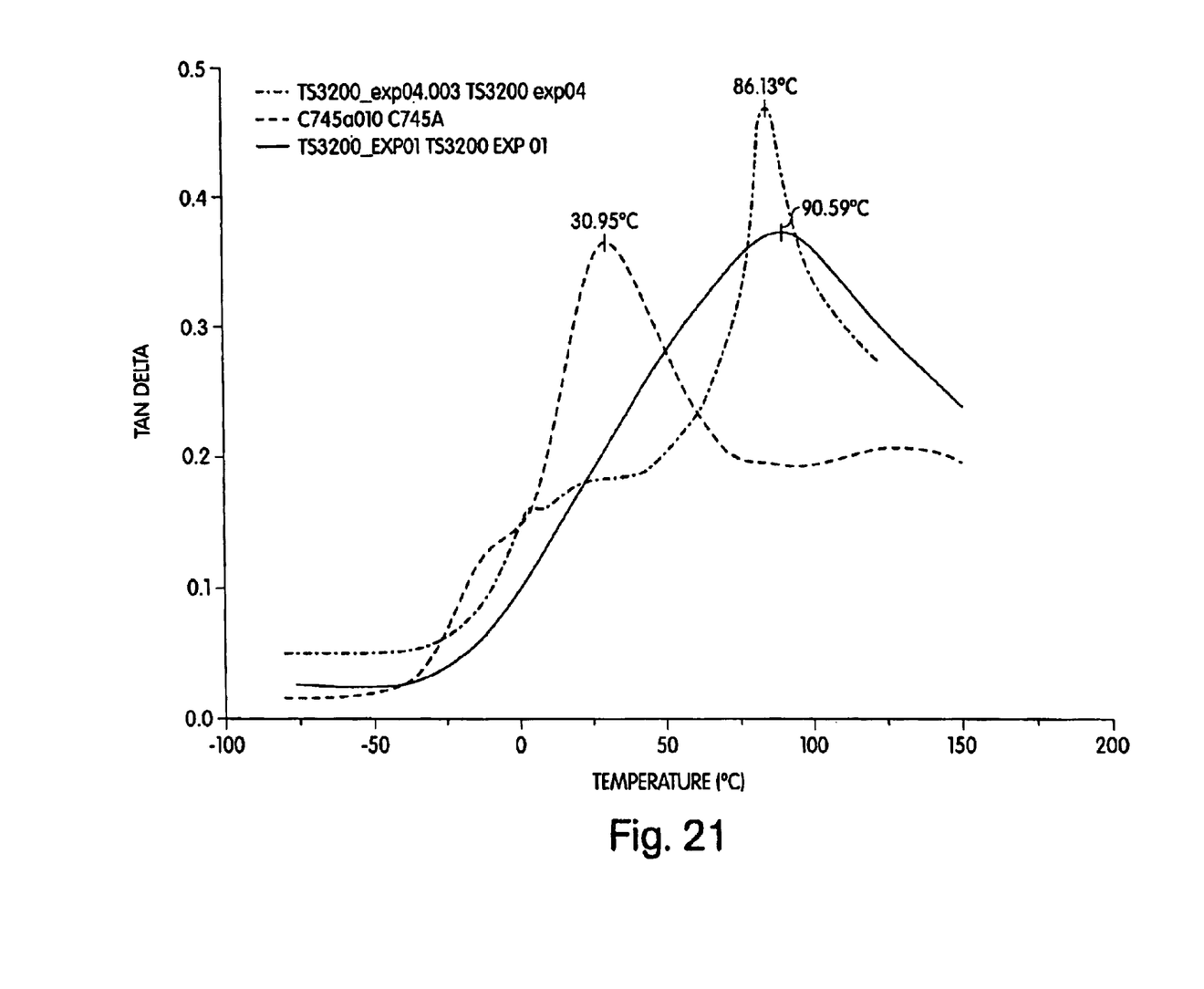
FIG. 21 illustrates a graph comparing glass transition temperatures of traditional coated reinforcements with flexible coated reinforcements of the present invention.

FIG. 21 is a comparative graph depicting glass transition temperatures of traditional coated reinforcements and the flexible coated reinforcements of the present invention. In particular, the glass transition temperature of traditional glass fibers coated with latex and acrylic wax is shown in comparison to glass transition temperatures of glass fibers coated with a low molecular weight mineral wax and an ethylene acrylic acid (EAA) topcoat and glass fibers coated with a low molecular weight mineral wax and ethylene vinyl acetate (EVA) topcoat.

As can be seen in FIG. 21, the standard thermoset CR745A flexible reinforcement has a glass transition temperature, Tg, of 30.96°. Tg is the temperature where an amorphous polymer transitions from a brittle, vitreous material to a more pliable, more flexible, softer material. In contrast to the standard reinforcement, the two thermoplastic-coated reinforcements have Tg's that are about 86° and 91° C., respectively. The higher Tg allows for a processable and more flexible reinforcement at the cable's upper range of the usual operating range of −40° to +80° C. In contrast the polymer transitions to a stiff matrix at the lower temperature range. Being able to control Tg by selective choice of thermoplastic materials or blends of such materials and appropriate modifiers allows for the reinforcement to be customized to precisely meet the cable's performance requirements. As the reinforcement transitions from a flexible to a rigid member, the cable is protected from shrinkage from the polyethylene or other jacketing material as the cable experiences temperature cycles. Uncontrolled shrinkage can cause optical fiber signal attenuation or catastrophic optical fiber breakage.

While the invention has been described in terms of preferred embodiments, it will be understood, of course, that the invention is not limited thereto since modifications may be made by those skilled in the art, particularly in light of the foregoing teachings.

What is claimed is:

1. A flexible, rodent resistant reinforcement member for a communications cable comprising:
   a plurality of high modulus fibers, each high modulus fiber defining a diameter from about 1 to about 89 microns; and
   a primary saturant coupled to said plurality of high modulus fibers wherein said primary saturant surrounds and encases said plurality of high modulus fibers and said primary saturant fills interstices defined between each high modulus fiber, said primary saturant having a melting point below approximately 300 degrees Celsius and a melt viscosity of less than approximately 1000 centipoise.

2. The flexible, rodent resistant reinforcement member of claim 1, wherein said primary saturant has a melting point between about 100 to about 150 degrees Celsius and a melt viscosity of less than 500 centipoise.

3. The flexible, rodent resistant reinforcement member of claim 1, wherein said plurality of high modulus fibers comprises a plurality of high modulus fibers selected from the group consisting of a plurality of sized carbon fibers, a plurality of unsized carbon fibers, a plurality of sized high silica glass, a plurality of unsized high silica glass, and combinations thereof.

4. The flexible, rodent resistant reinforcement member of claim 1, wherein said plurality of high modulus fibers comprises a plurality of glass fiber strands.

5. The flexible, rodent resistant reinforcement member of claim 4, wherein said plurality of glass fiber strands comprises a plurality of glass fiber strands selected from the group consisting of a plurality of sized E-type glass fiber strands, a plurality of unsized E-type glass fiber strands, a plurality of sized ECR-type glass fibers, and a plurality of unsized ECR-type glass fibers, and combinations thereof.

6. The flexible, rodent resistant reinforcement member of claim 1, wherein said plurality of high modulus fibers comprises a plurality of glass fiber strands and at least one bundle of high modulus fibers, each of said at least one bundle of high modulus fibers comprising a plurality of glass fiber filaments.

7. The flexible, rodent resistant reinforcement member of claim 1, wherein said primary saturant comprises a low molecular weight mineral wax.

8. The flexible reinforcement member of claim 7, wherein said low molecular weight mineral wax is selected from the group consisting of a low molecular weight microcrystalline wax, a low molecular weight polyalphaolefin wax, a low molecular weight polyethylene wax, a modified (oxidized or maleated) polyolefin such as polyethylene or polypropylene, and blends thereof.

9. The flexible, rodent resistant reinforcement member of claim 1, wherein said primary saturant comprises a blend of a low molecular weight microcrystalline wax and a styrene butadiene rubber, wherein said blend is between approximately 0.1 and 99.9 percent by weight of said low molecular weight microcrystalline wax and between approximately 0.1 and 99.9 percent by weight of said styrene butadiene rubber.

10. The flexible, rodent resistant reinforcement member of claim 9, wherein said blend comprises a 50/50 by weight blend of said low molecular weight microcrystalline wax and said styrene butadiene rubber.

11. The flexible, rodent resistant reinforcement member of claim 1, wherein said plurality of high modulus fibers comprises at least one bundle of high modulus fibers, each of said at least one bundle of high modulus fibers comprising a plurality of glass fiber filaments.

12. The flexible, rodent resistant reinforcement member of claim 1, wherein each high modulus fiber defines a diameter from about 15 to about 36 microns.

13. The flexible, rodent resistant reinforcement member of claim 12, wherein each high modulus fiber defines a diameter from about 34 to about 36 microns.

14. The method of claim 1, wherein said fiber diameter is between about 15 to about 36 microns.

15. The method of claim 14, wherein said fiber diameter is between about 34 and about 36 microns.

* * * * *